United States Patent [19]

Panique et al.

[11] Patent Number: 4,875,291

[45] Date of Patent: Oct. 24, 1989

[54] ROTATING REFLECTOR PRISM AND TARGET

[75] Inventors: Kenneth L. Panique, Orange; Jeffrey B. Frank, Santa Ana, both of Calif.

[73] Assignee: Omni Optical Products, Inc., Santa Ana, Calif.

[21] Appl. No.: 187,089

[22] Filed: Apr. 28, 1988

Related U.S. Application Data

[63] Continuation-in-part of Ser. No. 28,615, Mar. 20, 1987, abandoned.

[51] Int. Cl.$^4$ .......................... G01C 15/06; G02B 7/18
[52] U.S. Cl. ............................................. 33/293; 356/5; 356/152; 350/100; 350/102; 33/299
[58] Field of Search .................. 33/287, 288, 293, 294, 33/295, 296, 297, 298, 299; 350/97, 100, 102; 356/152, 5

[56] References Cited

U.S. PATENT DOCUMENTS

| | | | |
|---|---|---|---|
| 1,953,804 | 4/1934 | Hayes | 33/281 |
| 4,311,382 | 1/1982 | Buckley et al | 33/293 |
| 4,343,550 | 8/1982 | Buckley et al. | 33/293 |
| 4,413,907 | 11/1983 | Lane | 356/5 |
| 4,470,664 | 9/1984 | Shirasawa | 33/293 |
| 4,519,674 | 5/1985 | Buckley et al. | 33/293 |

FOREIGN PATENT DOCUMENTS 2354935 5/1975 Fed. Rep. of Germany .

OTHER PUBLICATIONS

Topcon Reflector System brochure (date unkown).
Pentax brochure titled "Prisms, Targets and Mounts" (date unknown).
Wild brochure titled "Wild Reflector Equipment for the Tachymat and Distomats" (date unknown).
Delta Optiks brochure titled "EDM Reflector Systems" (date unknown).
Lietz catalog 102, pp. 77–83 (date unknown).
Wild brochure titled "Wild DI3 Distomat" (date unknown).

Primary Examiner—William A. Cuchlinski, Jr.
Assistant Examiner—Diego F. F. Gutierrez
Attorney, Agent, or Firm—Knobbe, Martens, Olson & Bear

[57] ABSTRACT

In a device for use as a remote reflector in an electronic distance measuring instrument, a prism is mounted in the center of a two sided target, with both the prism and target being rotatable 360°, as a unit, about an elevational axis to provide bi-directional plunging. A yoke assembly allows this 360° rotation. A second rotational joint on the yoke provides azimuth orientation of the prism and target assembly. Elevational alignment indicators, on the rotatable connection between the yoke and target allow rough alignment, while collimator sights mounted on the target provide more precise alignment.

22 Claims, 2 Drawing Sheets

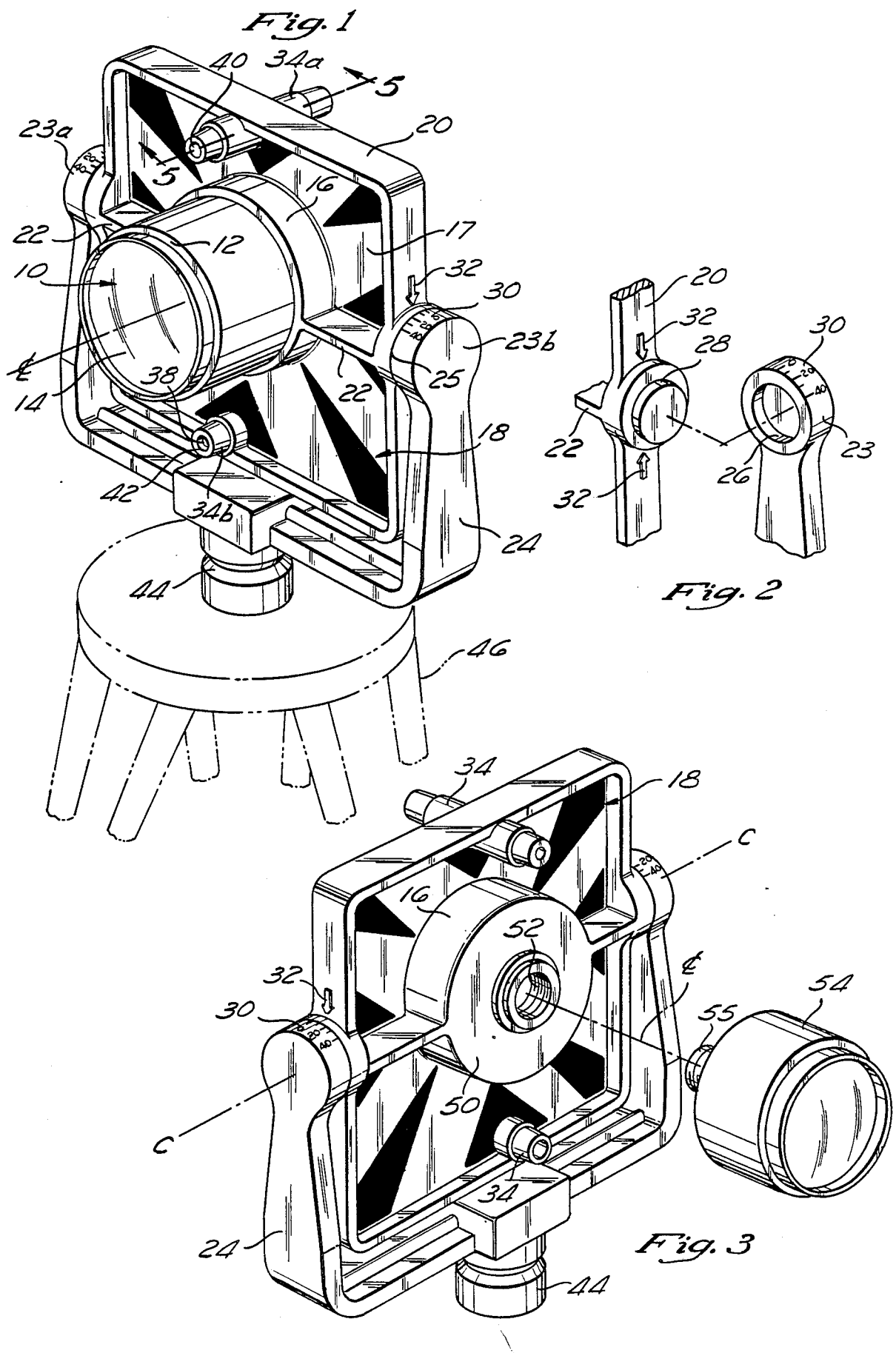

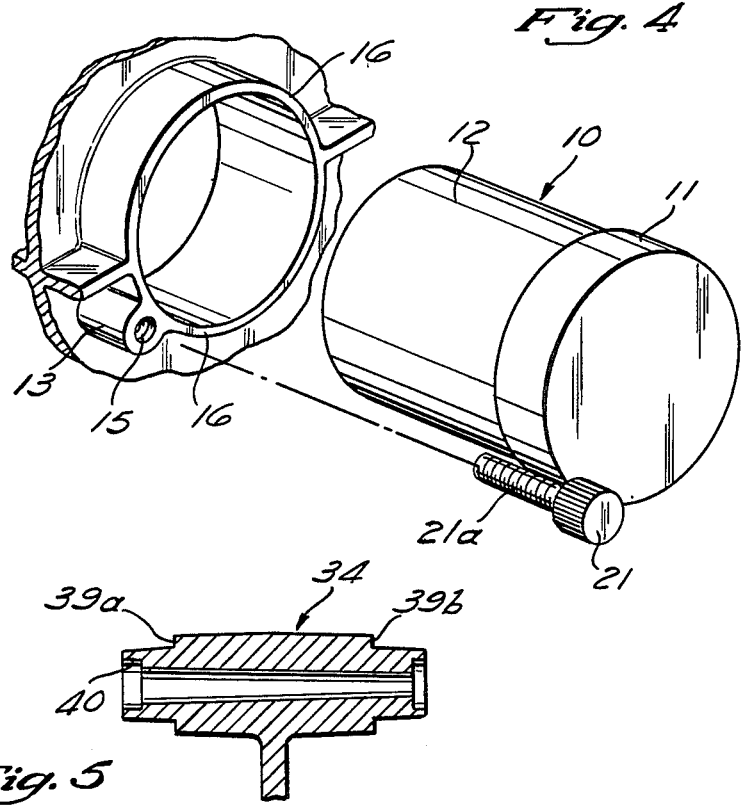
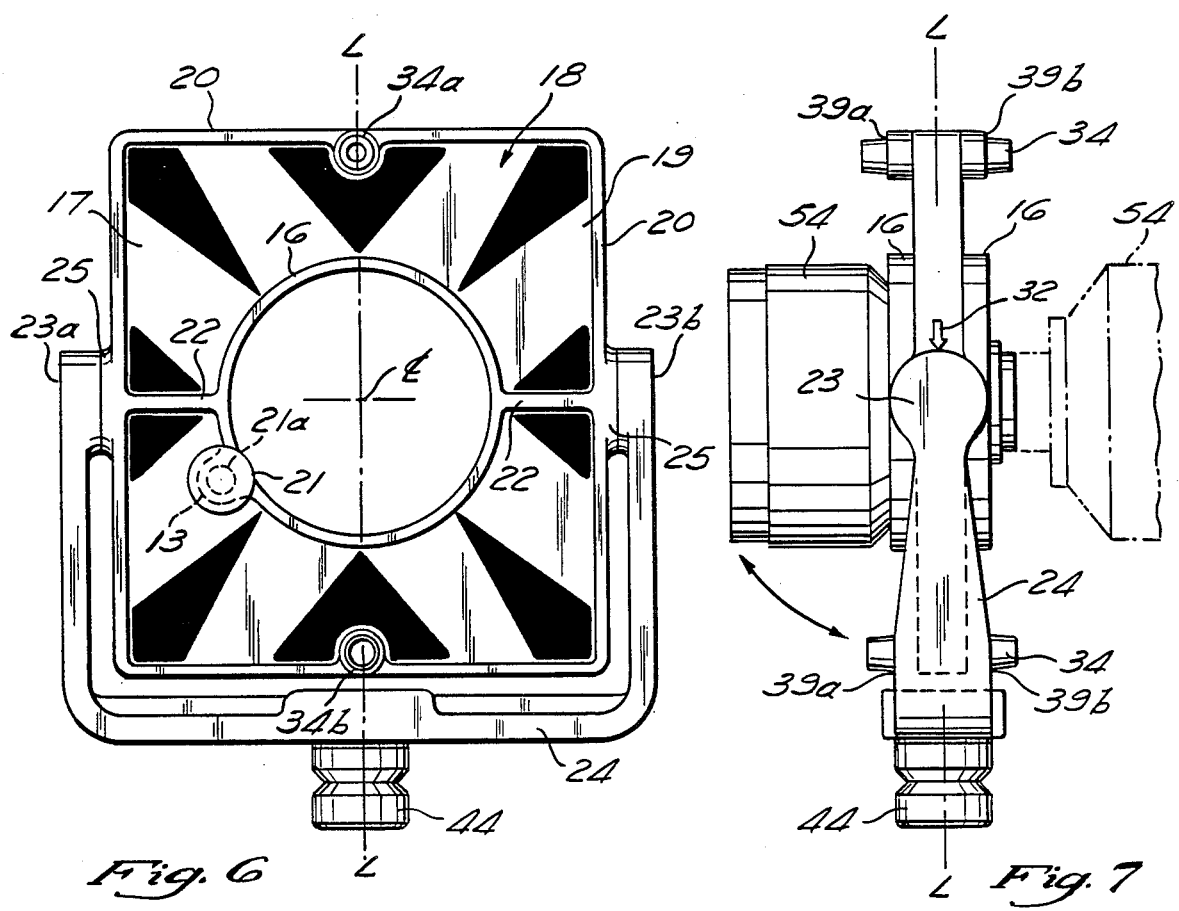

ROTATING REFLECTOR PRISM AND TARGET

This is a continuation-in-part of parent patent application, Ser. No. 28,615, filed Mar. 20, 1987, inventors Kenneth L. Panique and Jeffrey B. Frank, entitled Rotating Reflector Prism and Target, now abandoned.

BACKGROUND OF THE INVENTION

This invention relates to distance measuring devices, and more specifically to a retro-reflective prism assembly and target for use with electronic distance measuring instruments.

In the last several years, optical surveying equipment has evolved to where infrared and laser optical systems are used in conjunction with electronic distance measuring systems, typically in civil engineering applications such as surveying. These electronic distance measuring systems provide range and angular information with respect to remotely located reflecting devices which can be placed up to several kilometers from the measuring instrument.

The early type of measuring systems used a telescope or theodolite rigidly mounted to a support, such as a tripod. A "mount-on" ranging system was also mounted to the same support as the theodolite, with the optical paths of the ranging system and the theodolite being parallel, but offset by a known distance. A retro-reflector was mounted above the target, such that alignment of the theodolite with the target aligned the ranging system with the retro-reflector. In this type of measuring system, the targets were stationary and the accuracy of the ranging system was degraded, or unworkable, if the target was mounted so as to tile with the retro-reflector. More recently, the alignment theodolite optics and the ranging optics have been designed as to be coaxial. With this coaxial system, sometimes referred to as a "total station," it is preferred that the target tilt with the retro-reflector. since the tilting target/retro-reflector is not suitable for the "mount-on" ranging system, a different retro-reflector typically had to be used for each type of electronic measuring system.

There is thus a need for a remote target and retro-reflector that can be used with both the "mount-on" and the coaxial types of electronic distance measuring systems.

These electronic distance measuring instruments usually consist of two main components, an emitter/receiver, and a remote reflector. The emitter/receiver transmits either infrared or laser energy to a remotely placed reflector assembly which reflects the energy back to a receiver which in turn is connected to an electronic calculating system.

The remote reflectors typically comprise retro-reflecting prisms, such as corner cubes, which have reflecting optics that reflect incident energy on a path that is colinear with the incident energy. Unfortunately, the sensitivity of the receiving portion of the electronic distance measuring instruments usually requires that the remote reflector be adjusted to be substantially perpendicular or normal to the incoming energy. Thus, the remote reflector prism should be positioned in both azimuth and elevation to permit the user to adjust the reflector until it is substantially normal to the incoming energy, and thereby enable the receiver to work at its optimum capacity.

To facilitate initial alignment, a target is sometimes placed adjacent the remote reflector. These targets tend to take the form of rods with alternating red and white stripes, or targets with black and white stripes converging at, or directed towards, the center of the target. As described previously, in some systems the targets are often mounted adjacent to, and sometimes connected to, the reflecting prism.

The remote reflecting prisms are sometimes designed to be "plunged," which refers to the ability to rotate the reflecting prism 180° about a horizontal axis so that the prism can be redirected to point in substantially the opposite direction, without moving the support on which the remote reflector prism is mounted.

There is presently no easy way to allow the remote reflecting prism to be plunged if the prism is connected to a target. The support for the remote reflecting prisms may allow a combined target and prism to rotate, but not to rotate sufficiently to plunge the prism. This rotational limitation is especially pronounced if a large target is used, or if the target surrounds a portion of the prism.

There is thus a need for the remote reflecting prism which can be plunged while simultaneously providing a sufficient target area, or other alignment means, to facilitate quick alignment of the remote reflecting prism with the emitter/receiver.

It is thus an object of this invention to provide a means for plunging both the target and prism assembly, simultaneously, in either direction about a single rotational axis.

It is further an object of this invention to provide a target which substantially surrounds the prism, and has the center of the target at the optical axis of the prism assembly.

It is an additional object of this invention to provide a target having a targeting surface on both sides of the target.

It is still a further object of this invention to provide course alignment indicators, as well as more precise alignment indicators so as to allow quick and easy alignment of the optical axis.

SUMMARY OF THE INVENTION

In an electronic distance measuring system, a beam of infrared or laser energy is emitted toward a retro-reflective device, which is preferably a remote reflective prism assembly, such as a corner cube. The retro-reflective prism assembly is mounted in receiving means at the center of a course alignment target which substantially surrounds the prism assembly. Either a conventional cylindrical prism assembly or a 0/30 millimeter offset prism assembly can be mounted in the receiving means for use with the target. The target preferably has targeting patterns on both sides of the target, is substantially perpendicular to the optical axis of the prism assembly and has the target pattern converging on the optical axis of the prism assembly. A bracket surrounds the outer periphery of the target and is connected to a central hub which supports the prism assembly.

There is thus provided a target area which substantially surrounds a prism, with the center of the target being the optical axis of the prism, so as to provide optimum alignment of the target and prism. Further, the target is two sided so the back side of the target can be used for alignment purposes to facilitate fast alignment with another electronic distance measuring system, or to allow a prism assembly to be used with either target pattern, without changing the alignment of the target.

A first rotational means, such as a yoke, allows rotation of the prism assembly and target about a first elevational axis. Preferably, the yoke connects two opposite sides of the bracket along a generally horizontal line passing through the optical axis of the prism assembly. The yoke allows rotation of the target and prism assembly in elevation but provides sufficient friction at the rotational joints such that while the target and prism assembly can be manually positioned, they will stay in position when released.

Indicating means indicate the elevation of the prism assembly, target, and receiving means relative to the one portion of the first rotational means. Preferably, angle indicators on the bracket and the yoke cooperate to indicate the elevation angle of the optical axis of the prism assembly relative to the yoke, and provide quick and easy course alignment of the prism alignment with an incident beam of energy.

The yoke provides sufficient clearance such that the target and prism assembly can be simultaneously rotated 360°. Thus, the prism assembly can be rotated 180° (or "plunged") about its first rotational axis in either direction, so as to provide ease of plunging the prism assembly, and to prevent the prism assembly from hitting the yoke inadvertently. Thus, the yoke supports the target and prism assembly so as to allow bi-directional plunging of the prism assembly and target.

Two collimator sights, mounted on the bracket adjacent the target, face in opposite directions, and are aligned substantially parallel with the optical axis of the prism assembly. These opposing collimator sights allow fine adjustments in the alignment of the target and the prism assembly with an incident infrared or laser beam, even when the prism assembly is plunged or rotated 180°.

A second rotational means allows rotation of the prism assembly and target about a second axis in azimuth. Preferably, the bottom of the yoke has a rotatable mounting assembly which allows the yoke to be connected to a support such as a tripod, yet still allows the yoke, and thus the prism assembly and target, to be rotated about a typically vertical axis so as to provide azimuth orientation of the prism assembly. The mount assembly has a friction lock which allows the yoke to remain in position, once a selected azimuth orientation is obtained.

Preferably, the target is integrally molded to the bracket surrounding the target, and to the hub which supports the prism assembly, to form a one-piece unit. Further, the collimator sights are also integrally molded to the bracket to form a one-piece unit. Molding of this one-piece unit provides manufacturing advantages not previously available when these various components were separately formed and subsequently assembled with greater consumption of time and labor.

BRIEF DESCRIPTION OF THE DRAWINGS

The aforementioned objects and advantages of the present invention as well as additional objects and advantages thereof, will be more fully understood with reference to the detailed description of a preferred embodiment of the invention when taken in conjunction with the accompanying drawings in which:

FIG. 1 is a front perspective view of one embodiment of this invention.

FIG. 2 is a perspective view of a simple rotational joint as used in this invention.

FIG. 3 is an exploded first perspective view of an alternate embodiment of this invention.

FIG. 4 is an exploded perspective view of a segment of the back side of the invention of FIG. 1.

FIG. 5 is a partial sectional view taken along 5—5 from FIG. 1.

FIG. 6 is a back plan view of the embodiment of FIG. 3.

DETAILED DESCRIPTION OF A PREFERRED EMBODIMENT

FIG. 1 shows a remote reflector for use with an electronic distance ranging system in which the remote reflector comprises a canister-type of retro-reflecting prism assembly 10, which in turn comprises a generally cylindrical tube or housing 12 in which is contained a retro-reflecting surface such as a corner cube 14. One end of the housing 12 is open so a beam of collimated incident infrared or laser energy from an emitter/receiver (not shown) can enter therein and be reflected by corner cube 14 along a path parallel to the path of the incident beam.

Referring to FIGS. 1 and 2, the prism assembly 10 is mounted in a receiving means which takes the form of a cylindrical flange such as tubular hub 16 which is sized to fit around the housing 12 (FIG. 1) and support the housing 12 within the hub 16. A hub 16 made of polycarbonate or "Lexan", having an internal diameter of approximately three inches, a thickness of approximately 0.1 inch, and a wide of approximately one inch, is believed suitable for use with a housing 12 (FIG. 1) having a diameter of about three inches.

Referring to FIGS. 1, 4, and 6, the end of the housing 12 opposite the open end has a radial projecting flange or rim 11. The rim 11 is larger in diameter than the hole in the hub 16, so the housing 12, and thus the prism assembly 10, cannot pass completely through the hub 16. A boss 13 on the side of the hub 16 has a metallic inserted threaded hole 15 located therein. A threaded retainer knob 21 has a threaded portion 219 which screws into the threaded hole 15. When the retainer knob 21 is fastened into the hole 15, a portion of the knob 21 extends into the hole formed by the hub 16. When the housing 12 is inserted into the hub 16, the retainer knob 21 overlaps the end of the housing 12 and the hub 6, and prevents removal of the prism assembly 10 from the hub 16. The retaining knob 21 can be tightened by screwing it into the hole 15, so as to securely position and hold the prism assembly 10. If desired, the boss 13 and 15 (FIGS. 4 and 6) can be provided on opposite ends of hub 16 so that a prism assembly 10 can be inserted into hub 16 from either direction.

Referring to FIG. 1, when the prism assembly 10 is inserted into the hub 16, the optical axis ( ¢ ) of prism assembly 10 coincides with the predetermined longitudinal axis of hub 16. The hub 16, and thus the prism 10, is located at the center of a target 18. Preferably, the target 18 substantially surrounds the prism assembly 10. The optical axis of prism assembly 10, and the longitudinal axis of hub 16, are substantially perpendicular or normal to the surface of target 18. The target 18 has a generally square shape, typically some five inches on a side, and is connected to the longitudinal center of hub 16.

The front surface 17 of the target 18 faces the same direction as the open end of prism 10, and is marked with a targeting pattern which comprises a generally black background with a plurality of broad white stripes passing through the center of target 18. The longitudinal axis of prism assembly 10 and corner cube 14, and a longitudinal axis of hub 16, are also located at the center of target 18.

The pattern on target 18 thus forms a series of alternating reflective and absorption patterns converging toward the center of the optical axis of prism assembly 10. The pattern on the target 18 acts as a coarse alignment indicator to facilitate alignment of the incident beam of energy with the target 18, and thus with the optical axis of prism assembly 10.

The target 18 also serves to locate the optical axis of prism assembly 10, which is very important for optimum operation of an electronic distance measuring system. The use of a target 18 surrounding the prism assembly 10, and with the targeting pattern centered on the optical axis of prism assembly 10, allows the target 18 and prism assembly 10 to be used with either a colinear "total station" electronic distance measuring system, or with a "mounted on" theodolite system. Thus, the same target/prism assembly can be used with either system, thereby reducing the inventory of components that must be maintained.

Preferably, the opposing surface, or backside surface 19 (FIG. 6) of target 18 has a similar, and preferably an identical pattern which can also function to facilitate alignment of the back surface 19 with an incident beam of energy. Since the patterns are the same, the description will not be repeated in detail.

The use of a target 18 with targeting patterns on both sides allows a prism assembly 10 to be inserted into hub 10 from either side of the target 18. The two-sided target 18 also allows the target 18 to be used with two electronic measuring devices simultaneously, thereby increasing the speed of measurement. It also facilitates setup and operation by a single person since the person can align on the target 18, take a measurement, and then reposition the emitter/receiver for another alignment, without having to return to the target 18.

Referring to FIGS. 1 and 6, the target 18 is surrounded by a frame 20, which preferably comprises a strip of polycarbonate, having a rectangular cross section, a width of about one-half inch, and a thickness of about 0.12 inches. The target 18 is connected to the frame 20 along the inside center of the frame 20. To help support the hub 16 and prism assembly 10, two flanges 22 extend from opposing sides of frame 20 a generally horizontal axis toward the center of target 18, and connect the sides of frame 20 with hub 16. The flanges 22 have a rectangular cross section, and are approximately 0.12 inches thick, with the same width as the frame 20 and the hub 16. The target 18 is preferably connected to the flanges 22 along the longitudinal center of the flanges 22, and also connected to the center of hub 16. The target 18, flange 22, and hub 16 thus serve to support the prism assembly 10 in the center of frame 20, and provide a support and receiving means for prism assembly 10.

Preferably, the target 18, flanges 22, hub 16 and frame 20 are simultaneously molded to form a one-piece, integrally molded unit. The one-piece molding provides advantages in reducing overall manufacturing costs, reducing assembly costs, and facilitating accurate positioning of the target with respect to the hub. When used herein, the term integrally molded includes such manufacturing techniques as injection molding of materials, die casting, forging or stamping, which result in one-piece, integral construction.

In order to allow the frame 20, target 18, and retroreflecting prism assembly 10 to rotate in elevation, the frame 20 is rotatably mounted on a yoke 24 by joints 25. The yoke 24 comprises a generally U-shaped bracket with a generally rectangular cross section. Referring to FIG. 1, each free end 23 of the yoke 24, has a circular aperture 26. Projections 28 on the exterior of frame 20 cooperate with the aperture 26 to form a rotatable joint 25 (FIGS. 1 and 6). The projections 28 are located on the side of the frame 20 opposite the connection with the flange 22. Preferably, by means known in the art and not described in detail herein, the joint 25 (FIGS. 1 and 6) is a friction joint having such that the frictional drag in the joint 25 will allow the frame 20 to be moved by hand pressure, yet not move when released.

Referring to FIG. 1, there is thus provided elevation rotating means by which the frame 20, target 18, and prism assembly 10 can be simultaneously rotated about a first axis in elevation, with the friction in the joint 25 maintaining the elevation angle at which an operator releases the frame 20. Preferably, the yoke 24 allows rotation of the frame 20, target 18, and prism assembly, throughout a full 360° about an axis through joints 25. Thus, the prism assembly 10 and target 18 can be "plunged" (rotated 180°), by rotation in either direction about the rotational axis, which is typically horizontal. THe arrangement allows bi-directional "plunging."

Making both the target 18 and prism assembly 10 plungeable as a unit increases the predictability of the alignment of the target 18 with the prism assembly 10, and saves time as the target 18 does not need to be removed and reattached in order to plunge the prism assembly 10. Further, the targeting pattern on the target 18 can be accurately aligned with the optical axis of prism assembly 10 and that alignment should be accurately maintained. Further, allowing the prism assembly 10 to be plunged by rotating in either direction prevents inadvertent damage to the prism assembly 10 which can occur in prior art devices when the prism assembly hits the yoke. This contact is avoided in the present design since the yoke 24 allows the prism assembly 10 to rotate past the bottom of the yoke 24 without contacting the yoke.

Referring to FIG. 1, on at least one of the two ends 23 and 23b of the yoke 24, are located a plurality of indices such as angle markings 30. A pointer 32 is placed on the exterior side of frame 20 adjacent the angle markings 30. The pointer 32 and the angle markings 30 cooperate to indicate the elevation angle of the optical axis of prism assembly 10, with respect to the yoke 24. Thus, the markings 30 and pointer 32 enable a quick, but somewhat coarse alignment of the prism assembly 10. Further, if the prism assembly 10 is plunged, the markings 30 and pointer 32 enable a person to roughly align the optical axis of prism assembly 10 in elevation. There is thus provided an indicating means for indicating the elevational orientation of the prism assembly 10 with respect to the elevation rotation means of yoke 24.

Referring to FIGS. 1, 5, and 6, to provide more accurate alignment of the target 18 and prism assembly 10 with a beam of incident infrared or laser energy, two collimator sights 34 are used which, when aligned with an incident beam of infrared or laser light, indicate correct. These collimator sights 34 are well known in the art and are not described in detail herein.

Referring to FIGS. 1 and 6, preferably, there are two collimator sights 34a and 34b, with a first collimator sight 34a being located at the top center of the frame 20, along a vertical axis passing through the optical axis of prism assembly 10. The second collimator sight 34b is diametrically opposite collimator sight 34a, and is located at the bottom center of the frame 20. The collimator sights 34 are axially aligned to be parallel with the optical axis of prism assembly 10. Preferably, the sight collimators 34 are integrally molded with frame 20 to form an integrally molded, one-piece construction.

Since the frame 20, target 18, and prism assembly 10 are plungeable as a unit, collimator sight 34a is oriented 180° opposite that of collimator sight 34b. Thus, no matter which direction the prism assembly 10 is oriented, or plunged, one of the collimator sights 34 can be used to provide more precise alignment of the optical axis of prism assembly 10. Further, the use of two collimator sights 34 allows alignment of the backside of target 18 with one optical emitter, while the front side of target 18 can be aligned with a different optical emitter.

Referring to FIGS. 1 and 6, a second rotational means is provided to rotate the retro-reflecting prism assembly 10, and target 18, in azimuth orientation. At the bottom center of the U-shaped yoke 24, is a depending, rotation mount 44. The mount 44 allows the yoke 24 to be connected to a support such as tripod 46 (FIG. 1). The mount 44 allows azimuth rotation of the yoke 24 about a usually vertically axis, such as axis L, and thus allows azimuth rotation of the target 18 and prism assembly 10. The mount 44 is well known in the art and is not described in detail herein. A friction lock can releasably fasten mount 24 in a desired azimuth orientation by means well known in the art and not described in detail herein.

FIGS. 3 and 7 show an alternate embodiment of this invention in which one end of the hub 16 is closed off by a back plate 50 (FIG. 3) to form a different receiving means for a different type of retro-reflective device. A threaded hole 52 is located at the center of back plate 50. The hole 52 allows the use of a 30 millimeter offset prism assembly 54, which has a threaded end 55. If the prism assembly 54, via threaded end 55, is threaded in hole 52 in one side of back plate 50, as shown in FIG. 3 (and in phantom in FIG. 7), the prism center is 30 millimeters offset from the axis about which the prism assembly 54 and target 18 (FIG. 3) are rotated. If the prism assembly 54 is threaded in the opposing side of back plate 50 (FIG. 3) as indicated in FIG. 7, the prism center has a zero millimeter offset from the axis c—c (FIG. 3) about which the prism assembly 54 and target 18 are rotated.

Alternatively phrased, when the prism assembly 54 is mounted in the hole 52, the imaginary reflecting surface of the prism (not shown) inside the prism assembly 54, is aligned with the vertical line L so that the prism assembly 54 is arranged with a zero prism constant. On the other hand, when the prism assembly 54 is mounted to the opposing side of back plate 50, as indicated in phantom, the imaginary reflecting surface of the prism in the prism assembly 54 is offset from the vertical line L by a distance of 30 millimeters, so that the prism assembly 54 has a prism constant of 30 millimeters. Again, the yoke 24 is designed so that the prism assembly 54 can be rotated 360° with the target 18 attached no matter whether the prism assembly 54 is mounted with a 0 mm offset, or a 30 mm offset.

The optical axis of prism assembly 54 coincides with the predetermined longitudinal axis of hole 52, so as to facilitate correct alignment of the target 18, and collimators 34. There is thus provided a means for receiving a retro-reflective device so as to align that device with a target 18 and collimator 34.

An additional alignment feature is shown in FIGS. 5 and 7. There are shoulders 39a and 39b adjacent opposite ends of the collimators 34. The distance between shoulders 39a and 39b is the same as the width of the yoke 24 (FIG. 7). By sighting across opposing sides of the yoke 24 (FIG. 7), the shoulders 39 and 39b can be aligned with the edges of yoke 24 so as to provide a physical alignment of the target 18 (FIG. 7) and prism 54 (FIG. 7) with the yoke 24.

We claim:

1. A combined sighting target and bracket for receiving a retro-reflecting device for use in conjunction with remotely located electronic distance measuring instruments, comprising:

means for receiving a retro-reflecting device to position an optical axis of said retro-reflecting device along a predetermined axis;

a target, connected to said receiving means, for coarse alignment of an incident beam of energy, said target being oriented substantially perpendicular to said predetermined axis; and first rotational means for rotating said target and said receiving means simultaneously in elevation, said rotational means allowing 360° rotation when a retro-reflective device is positioned in said receiving means.

2. A combination as defined in claim 1, further comprising second rotational means for rotating said receiving means and said target in azimuth.

3. A combination as defined in claim 2, wherein said target has two opposing surfaces with a targeting pattern on each of said opposing surfaces, said target substantially surrounding said receiving means, with said predetermined axis passing substantially through the center of said target.

4. A combination as defined in claim 3, further comprising two collimator sights, substantially aligned with said predetermined axis, said sights facing in opposite directions.

5. An apparatus as defined in claim 4, wherein said receiving means, target, and collimator sights are integrally molded to form a one-piece unit.

6. A combination as defined in claim 2, wherein said target supports said receiving means.

7. A combination as defined in claim 2, further comprising two collimator sights, substantially aligned with said predetermined axis, said sights facing in opposite directions.

8. A combination as defined in claim 2, further comprising indicating means for indicating the elevation of said target and predetermined axis relative to said rotational means.

9. A combination as defined in claim 3, further comprising indicating means for indicating the elevation of said target and predetermined axis relative to said rotational means.

10. A target and apparatus for receiving a retro-reflecting device for use in conjunction with remotely located electronic distance measuring instruments, comprising:

receiving means for receiving a retro-reflective device and positioning said device so the optical axis of said retro-reflective device substantially coincides with a predetermined axis;

a target surrounding said receiving means, said target having a target pattern on two sides of said target with the center of said target pattern being located on said predetermined axis and being integrally molded with said receiving means;

first rotational means for rotating said target and said receiving means simultaneously about a first axis to orient said retro-reflector device in elevation;

second rotational means for rotating said receiving means and said target about a second axis to orient said target and receiving means in azimuth; and two collimator sights connected to said target, said two sights being aligned along axes substantially parallel with said predetermined axis of said retro-reflecting device, said two sights pointing in substantially opposite directions along said predetermined axes.

11. An apparatus as defined in claim 10, wherein said rotational means allows 360 rotation of said target and said receiving means about said first axis, when a retro-reflective device is inserted into said receiving means.

12. An apparatus as defined in claim 10, further comprising:
indicating means for indicating the elevational orientation of said predetermined axis relative to said first rotational means.

13. An apparatus as defined in claim 10, wherein said target and receiving means are integrally molded to form a one-piece unit.

14. An apparatus as defined in claim 10, wherein said target, receiving means and collimator sights are integrally molded to form a one-piece unit.

15. A combined sighting target and bracket for receiving a retro-reflecting device for use in conjunction with remotely located electronic distance measuring instruments, comprising:

receiving means for receiving a retro-reflective device, said retro-reflective device having an optical axis;

a target, having a targeting pattern on two opposing sides of said target, said target being aligned substantially perpendicular to said optical axis when said retro-reflecting device is inserted into said receiving means, said target being mounted so as to maintain said perpendicular alignment as said retro-reflective device is moved in elevation and azimuth;

a frame supporting said target and receiving means;

first rotational means connected to said frame for rotating said receiving means and target in elevation about a first axis, said first rotational means permitting bidirectional plunging of said target and receiving means about said first axis when a retro-reflecting device is inserted into said receiving means;

second rotational means for rotating said receiving means and said target in azimuth about a second axis;

two collimator sights mounted on one of said target or frame, said sights aligned along axes substantially parallel with said optical axis, said sights orientated in opposite directions along said axis; and elevation indicator means for indicating the elevation orientation of said optical axis with respect to said first rotational means.

16. The combination as defined in claim 15, further comprising a frame surrounding the periphery of said target, said collimator sights being attached to said frame, said sights and frame not inhibiting 360° rotation of said receiving means and target about said first axis when a retro-reflector devices is inserted into said receiving means.

17. The combination as defined in claim 15, wherein said target substantially surrounds said receiving means, and wherein the center of said target is on said optical axis when a retro-reflective device is inserted into said receiving means.

18. An apparatus as defined in claim 15, wherein said frame, target, receiving means, and collimator sights are integrally molded to form a one-piece unit.

19. A combined sighting target and bracket for receiving a retro-reflecting device for use in conjunction with remotely located electronic distance measuring instruments, comprising:

receiving and retaining means for receiving and releasably retaining a retro-reflective device having an optical axis;

a target, having a targeting pattern on two opposing sides of said target, said target being aligned substantially perpendicular to said optical axis when a retro-reflective device is inserted into said receiving means, said target being mounted so as to maintain said perpendicular alignment as said receiving means and target are moved in elevation and azimuth;

a frame connected to said target and said receiving and retaining means, said receiving and retaining means being supported by one of said frame or target;

a yoke rotatably connected to said frame, supporting said frame, target and receiving means for rotation about a first axis, said yoke permitting bidirectional plunging of said target and receiving means about said first axis when a retro-reflective device is inserted into said receiving means; and a rotatable mount on said yoke to connect said yoke to a support, said rotatable mount allowing azimuth rotation of said receiving means and target.

20. A combination as defined in claim 19, further comprising angle indicator means connected to one of said frame or target, for indicating the orientation of an optical axis of a retro-reflector device inserted into said receiving means with respect to said yoke.

21. A reflector as defined in claim 20, further comprising two collimator sights on said target, said sights aligned along axes substantially parallel with said optical axis, said sights orientated in opposite directions along said optical axis.

22. An apparatus as defined in claim 21, wherein said frame, target, receiving and retaining means, and collimator sights are integrally molded to form a one-piece

* * * * *